United States Patent [19]

Wallace

[11] 4,195,800
[45] Apr. 1, 1980

[54] AUTOGYROS

[76] Inventor: John F. Wallace, 1 Jonathen Ct., Noble Park, Victoria, Australia

[21] Appl. No.: 833,918

[22] Filed: Sep. 16, 1977

[30] Foreign Application Priority Data

Sep. 28, 1976 [AU] Australia .............................. PC7548

[51] Int. Cl.² ........................ B64C 27/02; B64C 27/10
[52] U.S. Cl. .................................... 244/8; 244/17.11; 244/7 A; 416/244 R; 416/245 R
[58] Field of Search ...................... 244/6, 7 R, 7 A, 8, 244/17.11, 17.25, 12.2, 23 C; 416/244 R, 245 R, 175, 18, 112, 113, 114

[56] References Cited

U.S. PATENT DOCUMENTS

| 1,961,996 | 6/1934 | Williams | 244/8 |
|---|---|---|---|
| 2,020,235 | 11/1935 | Bradbury | 244/245 R |
| 2,106,783 | 2/1938 | Wilford | 244/8 |
| 3,106,964 | 10/1963 | Culver et al. | 416/18 |
| 3,118,504 | 1/1964 | Cresap | 244/17.25 |
| 3,327,969 | 6/1967 | Head | 244/7 R |
| 3,603,700 | 9/1971 | Eskeli | 416/175 |

FOREIGN PATENT DOCUMENTS

1018196 12/1952 France .............................. 244/12.2

*Primary Examiner*—Galen L. Barefoot

[57] ABSTRACT

Autogyro rotor comprises blades radiating outwardly from central disc structure. Disc structure extends over substantial part of the area of the rotor to increase lifting forces provided by rotor and may be shaped to produce aerodynamic lift on forward movement of rotor. Specifically, disc structure may include annular section of aerofoil cross-section surrounded by smaller annular section to produce similar effect to conventional aircraft wing flaps and slots. Blades are carried on shafts journalled in tubes extending out through disc structure and there is also disclosed a pitch control mechanism for rotating the shafts in the tubes to vary pitch of the blades.

10 Claims, 5 Drawing Figures

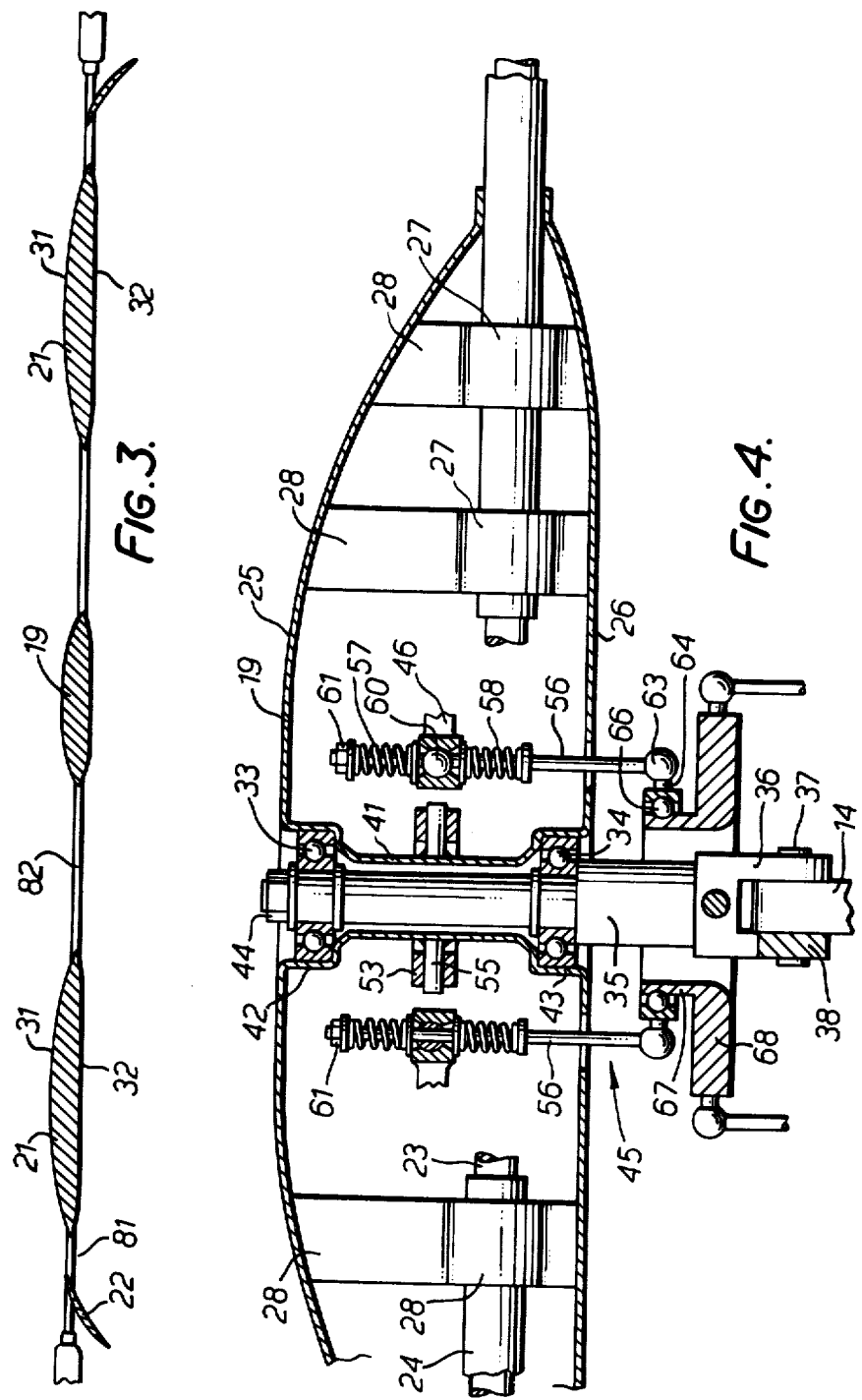

AUTOGYROS

BACKGROUND OF THE INVENTION

This invention relates to autogyros. More particularly it provides an improved autogyro rotor construction.

An autogyro generally consists of a wingless fuselage carrying a pylon to which is fitted a propeller-like rotor having a series of blades of aerofoil section. The fuselage is also equipped with a forward thrust unit such as an engine and propeller to drive the craft forwardly. As the craft is driven forwardly by the thrust unit the rotor is rotated by the action of relative wind on the blades and produces lift.

In conventional autogyro rotors most of the lift is achieved at the outer tips of the blades. The angular velocity of the inner sections of the blades is too low to produce significant lift and air tends to pass directly through the central part of the rotor without contributing significantly to the total lift produced by the rotor. The present invention provides an improved autogyro rotor in which the central part of the rotor can produce significant lifting forces whereby the total lift produced by the rotor is increased.

SUMMARY OF THE INVENTION

According to the invention there is provided an autogyro rotor comprising a disc structure and a plurality of blades radiating outwardly from the disc structure.

Preferably the outer periphery of the disc structure is spaced from the centre of the rotor by at least one half of the distance from the centre of the rotor to the outer tips of the blades. More particularly the outer periphery of the disc structure may be spaced from the centre of the rotor by between ⅜ and ⅝, and preferably about ½, of the distance from the centre of the rotor to the outer tips of the blades.

The invention also extends to an autogyro comprising a fuselage carrying a forward thrust unit and a pylon fitted with a rotor as above defined.

The disc structure of the rotor may be shaped to produce aerodynamic lift on forward movement of the rotor. It may comprise a central circular disc incorporating rotor mounting means for mounting the rotor to an autogyro pylon and one or more annular sections surrounding the circular disc and shaped to aerofoil cross-section.

The blades of the rotor may be carried on blade shafts extending through journals on the disc structure to permit the shafts to be angularly adjusted. The journals may be in the form of tubes fixed to the disc structure and radiating outwardly from the centre of the rotor.

BRIEF DESCRIPTION OF THE DRAWINGS

In order that the invention may be more fully explained one particular embodiment will be described with reference to the accompanying drawings in which:

FIG. 3 is a cross-section generally on the line 3—3 in FIG. 2;

FIG. 4 is a cross section generally on the line 4—4 in FIG. 2; and

DESCRIPTION OF PREFERRED EMBODIMENT

Figure 1:
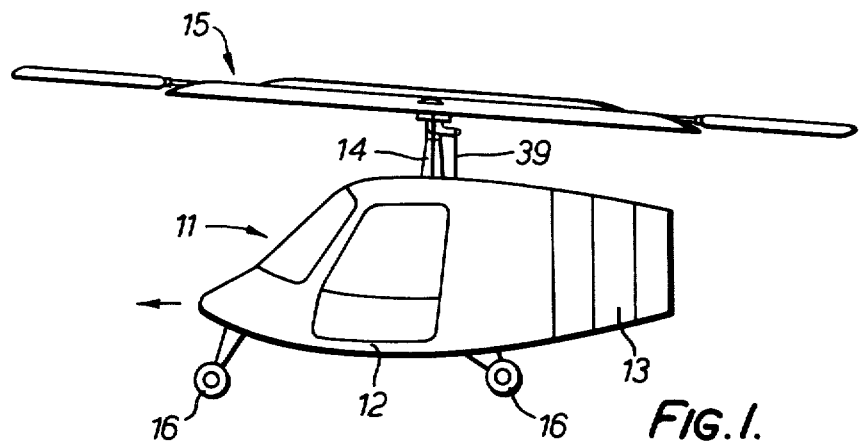
FIG. 1 illustrates an autogyro fitted with a rotor in accordance with the invention.
Figure 2:
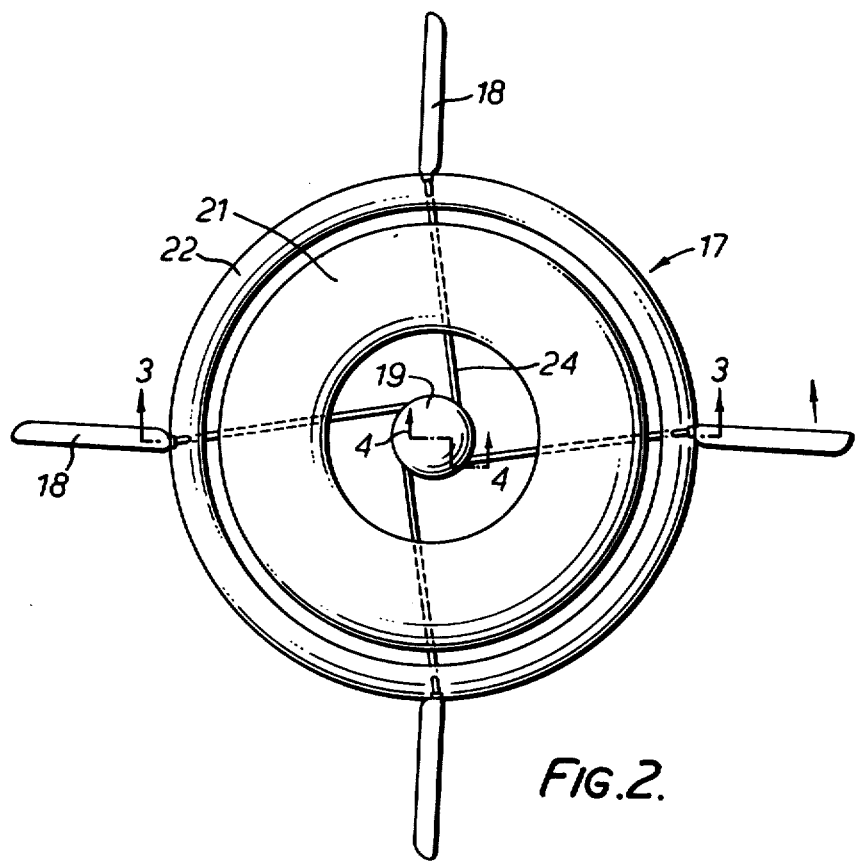
FIG. 2 is a plan view of the autogyro rotor.

The illustrated autogyro has a fuselage, denoted generally as 11, comprising a cabin section 12 behind which there is mounted a forward thrust unit 13. Thrust unit 13 may comprise a conventional engine and propeller assembly mounted within an outer casing which shrouds the propeller. Fuselage 11 is also fitted with landing wheels 16 and an upright pylon 14 which extends upwardly from cabin section 12 and is fitted with a rotor denoted generally as 15.

In operation of the autogyro, fuselage 11 is driven forward by thrust unit 13 and rotor 15 is rotated on pylon 14 by the action of relative wind on such forward movement to create lift.

Rotor 15 comprises a central disc structure denoted generally as 17 and four blades 18 which radiate outwardly from the disc structure. Disc structure 17 is comprised of a central circular disc 19 and two annular sections 21 and 22 disposed concentrically about central disc 19. Blades 18 are carried on four blade shafts 23 extending to the centre of the rotor through four tubes 24 which are fixed to central disc 19 and annular sections 21 and 22 so as to hold the outer sections 21, 22 in assembly with central disc 19 to form the composite disc structure 17 which will rotate with blades 18 in operation of the autogyro.

Central disc 19 is formed as a hollow sheet metal pod of aerofoil cross-section having an upwardly convex upper wall 25 and a lower wall 26 which is generally flat but curves upwardly at its outer margin to meet the upper wall at the outer edge of the disc except where the four tubes 24 extend inwardly into the disc at which locations the upper and lower walls may be shaped to fit snugly around the cylindrical tubes. The inner ends of tubes 24 are fixed to disc 19 by a resilient rubber mountings 27 installed in sturdy struts 28 fitted between the upper and lower walls 25, 26 of the disc.

The annular sections 21, 22 of disc structure 17 may be moulded of glass fibre reinforced plastics material. Each is formed to an aerofoil cross-section and with holes to receive tubes 24 which may be cemented or otherwise fastened to them. As indicated in FIG. 3, the aerofoil shape of section 21 has a convex upper surface 31 and a generally flat lower surface 32.

Outer annular section 22 is shaped to a relatively thin aerofoil section and is generally conically shaped so as to form an outwardly and downwardly projecting skirt at the outer periphery of disc structure 17.

Figure 5:
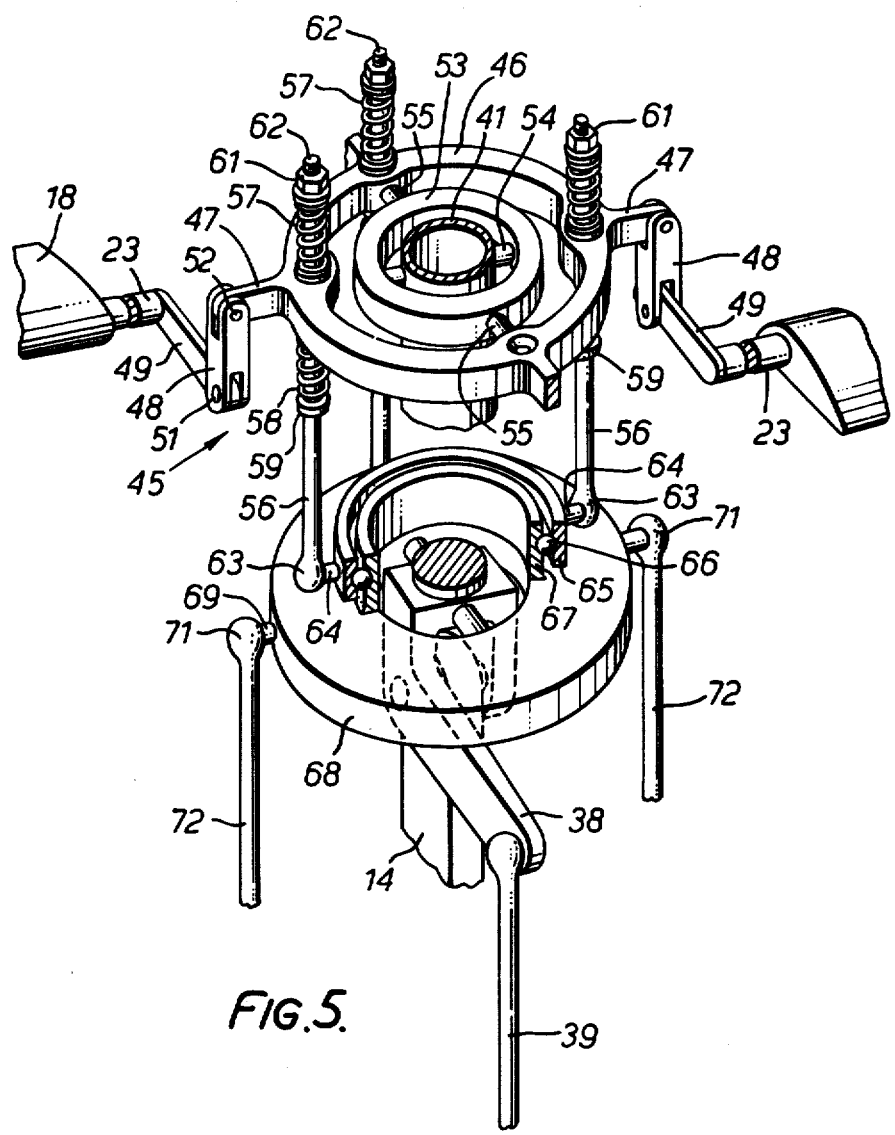
FIG. 5 is a perspective view of the rotor control connections.

The manner in which the rotor is mounted on pylon 14 is illustrated in FIGS. 4 and 5. The central disc 19 of the rotor is rotatably mounted by means of upper and lower ball race bearings 33, 34 on an upright axle 35 connected at its lower end via a yoke 36 and pivot pin 37 to the upper end of pylon 14 whereby the axle, and with it the rotor, can be pivoted in the fore and aft direction. A lever arm 38 is formed integrally with yoke 36 and the outer end of this lever arm is pivotally connected to a control rod 39 which extends downwardly into the body of the fuselage and is connected in conventional manner to a pilot's joystick in the cabin of the autogyro such that forward and backward movements of the joystick produce up and down movements of control rod 39 and consequent fore and aft tilting of axle 35 and rotor 15.

Central disc 19 has a central tubular wall 41 surrounding the upper end of axle 35 and having enlarged diameter upper and lower end portions 42, 43 serving as housings for the outer races of bearings 33, 34 which are held in place on the axle by means of a lock nut 44.

Tubes 24 serve as journal mountings for the rotor blade shafts 23 to permit the shafts to be angularly adjusted to vary the pitch of the rotor blades by means of a pitch control mechanism denoted generally as 45. This mechanism comprises an upper ring 46 provided with four radially outwardly projecting lugs 47 and four pairs of levers 48, 49 which provide interconnections between lugs 47 and the inner ends of rotor blade shafts 23. Levers 49 are fastened rigidly to blade shafts 23 and are pivotally connected by pivot pins 51 to the lower ends of levers 48, the upper ends of which are pivotally connected to ring lugs 47 by means of further pivot pins 52. Thus, vertical movements of ring lugs 47 will produce corresponding rotations of blade shafts 23 to alter the pitch of the blades.

Ring 46 is mounted on the central tube 41 of disc 19 so as to rotate with the rotor but so as to be capable of tilting in both the fore and aft direction and the transverse direction. This mounting is achieved via an inner ring 53 which is pivotally mounted on pivot pins 54 extending in the transverse direction and welded to the central tube 41 of disc 19. The outer ring 46 is pivotally mounted on pivot pins 55 welded to inner ring 53 to project outwardly in the fore and aft direction. Thus, ring 46 is mounted for pivoting movement about two mutually perpendicular axes, i.e. the common axis of pins 55 and the common axis of pins 54. Such pivoting movements are controlled by up and down movements of four upright rods 56 which slide through ball mountings 60 fitted to the ring at equal circumferential spacing. Rods 56 act on ring 46 via upper and lower compression springs 57, 58. Lower springs 58 are compressed between the underside of ring 46 and a series of collars 59 formed on rods 56 and upper springs 57 are compressed between the upper face of ring 46 and a set of tensioning nuts 61 which screw on to threads 62 formed on the upper ends of rods 56.

The lower ends of rods 56 are connected by knuckle joints 63 to a series of four pins 64 projecting radially outwardly from a ring 65 which is rotatably mounted by means of balls 66 on an upstanding cylindrical collar 67 of an annular disc 68. A pair of pins 69 project radially outwardly from disc 68 in a direction perpendicular to the fore and aft direction, i.e. perpendicular to the forward direction of travel, and these pins are connected by knuckle joints 71 to a pair of control rods 72 which extend one down each side of pylon 14 and into the fuselage body where there are connections to the joystick such that lateral movement of the joystick in one direction produces equal and opposite vertical movements of control rods 72 and movement of the joystick in the other lateral direction produces reverse movements of rods 72.

The equal and opposite up and down movements of rods 72 cause tilting movement of disc 68 transverse to the direction of movement of the auto gyro, i.e., about an axis extending in the fore and aft direction, which in turn produces through the action of rods 56 a similar tilting movement of the rotating ring 46. When ring 46 is tilted out of a plane perpendicular to the central axis of the rotor, levers 48, 49 act to vary the pitch of rotor blades 18 as they complete each revolution about the rotor axis. Each blade will move to a maximum pitch angle at one side of the rotor and will move to a minimum pitch angle at the diametrically opposite side of the rotor and will adopt an initially set intermediate pitch angle when passing through the forward and rear positions in which it is aligned in the fore and aft direction. The initial or intermediate pitch can be set by appropriate tightening of the spring tensioning nuts 61.

In use of the illustrated auto gyro, the pilot can vary the lift characteristics of the rotor by fore and aft tilting movements and also by increasing the pitch of the blades at either side of the rotor while simultaneously decreasing the pitch at the other. Springs 57, 58 help to absorb any unnecessarily jerky movements to allow smooth control of the rotor. Moreover, they provide a degree of automatic blade pitch compensation against disturbances due to localised air pockets. If the blades at any region of the rotor should strike an air pocket which tends to create excessive lift at that region, the reaction forces on the blades will be transferred back through the respective levers 49, 48 to the appropriate side of ring 46 and the ring can move on springs 57, 58 so that the blade pitch is decreased in the region of excessive lift and correspondingly decreased at the diametrically opposed region of the rotor without movement of the control rods. Since ring 46 is mounted so that it can pivot in two mutually perpendicular directions, such automatic compensation can counteract disturbances at any part of the rotor.

During flight, downward movement of the auto gyro under gravitational force is resisted by the barrier which the central disc structure 17 presents to upward movement of air through the central part of the rotor. Moreover, because of the aerofoil shaping and disposition of central disc 19 and annular sections 21, 22, forward movement of disc structure 17 generates aerodynamic lifting forces which increase the total lift produced by the rotor. Central disc 19 and annular section 21 act in similar fashion to a conventional aircraft wing and outer annular section 22 provides a slot and flap action as in conventional aircraft. Thus air can flow upwardly through the annular slot 81 between section 22 and the leading edge of annular section 21 to produce a free flow of air across the upper face 31 of the leading part of that section. The annular space 82 between central disc 19 and annular section 21 serves a similar function to enable air to flow freely over the upper surfaces of the central disc and the trailing part of annular section 21. The trailing part of annular section 22 also serves as a trailing edge flap to create additional lift. The slots 81, 82 also prevent a stalling effect when the autogyro is taking off at a high angle of attack.

To produce the necessary enhanced lift, disc structure 17 must cover quite a large area of the rotor. In fact, it should extend out from the centre of the rotor through at least one half of the distance from the centre of the rotor to the outer tips of blades 18. More particularly, it should preferably extend out to about two thirds of the distance to the outer tips of the blades. It is also preferred that the inner periphery of annular section 21 be spaced from the centre of the rotor by a distance approximately one quarter of the distance to the outer tips of the blades. In a typical rotor the diameter at the outer tips of the blades may be approximately 15 feet and the outer diameter of disc structure 17 may be about 10 feet.

The blades may be interchangeable so that their number and size can be varied according to the particular flight requirements. The blades must be flexible and strong and may be constructed from a metal such as aluminium or from a fibreglass reinforced plastics material. Weights may be attached to their outer tips to improve stability. The blades have aerofoil cross-sections such that on rotation they establish a decompressive region above the rotor and a compressive region below the rotor to provide lift. Each blade may also have a camber.

Because of the enhanced lift provided by the central disc structure of its rotor and the capacity to control the pitch of the blades, the illustrated autogyro is very manoeuvrable and safe in operation. In fact, even should the engine cut out while the autogyro is in flight the aerofoil effect of the central disc structure provides enough lift to enable the autogyro to glide gently to the ground. However, the illustrated construction has been advanced by way of example only and the invention is not limited to the details of this particular construction. In some circumstances, for example, the outer annular section 22 could be eliminated. It would also be possible to provide a disc structure comprised essentially of a single continuous disc either of annular form or having a solid centre without a central aperture. It would also be possible to mount the rotor on an axle fixed to the pylon and to alter the tilt of the rotor by tilting the whole body of the autogyro by means of a flap at the rear of the fuselage in similar manner to that on the tail section of a conventional aircraft. It would also be possible to fit to the fuselage of the autogyro a wind producing means such as a propeller to produce wind sufficient to turn the rotor when the autogyro is stationary or travelling at low speed. It is accordingly to be understood that many modifications and variations could be made to the illustrated construction without departing from the scope of the appended claims.

I claim:

1. An autogyro rotor comprising a disc structure and a plurality of blades radiating outwardly from the disc structure, wherein:
   the disc structure comprises a first annular member of aerofoil cross-section shaped to produce aerodynamic lift on forward movement of the rotor, the first annular member presenting an interior opening through which air can pass in use of the rotor; and
   the disc structure further comprises a second annular member of aerofoil cross-section spaced about said first annular member and extending outwardly and downwardly when the rotor is in use.

2. An autogyro rotor comprising a disc structure and a plurality of blades radiating outwardly from the disc structure, the disc structure comprising an annular member of aerofoil cross-section shaped to produce lift on forward movement of the rotor, a central disc disposed concentrically within the annular member, and a plurality of tubes radiating outwardly from the central disc and through the annular member and wherein the blades are carried on the outer ends of blade shafts extending through said tubes and rotatable therein to vary the pitch of the blades.

3. An autogyro rotor as claimed in claim 2, wherein the outer periphery of the disc structure is spaced from the centre of the rotor by at least one-half of the distance from the centre of the rotor to the outer tips of the blades.

4. An autogyro rotor as claimed in claim 3, wherein the outer periphery of the disc structure is spaced from the centre of the rotor by between ½ and ¾ of the distance of the centre of the rotor to the outer tips of the blades.

5. An autogyro rotor as claimed in claim 4, wherein the disc structure is shaped to produce aerodynamic lift on forward movement of the rotor.

6. An autogyro comprising:
   a fuselage;
   a forward thrust unit fitted to the fuselage;
   a pylon projecting upwardly from the fuselage;
   a rotor rotatably mounted on the pylon and comprising a disc structure and a plurality of blades radiating outwardly from the disc structure, the disc structure comprising an annular member of aerofoil cross-section shaped to produce lift on forward movement of the rotor, a central disc disposed concentrically within the annular member, and a plurality of tubes radiating outwardly from the central disc and through the annular member and wherein the blades are carried on the outer ends of blade shafts extending through said tubes and rotatable therein to vary the pitch of the blades, the outer periphery of the disc structure being spaced from the center of the rotor by at least one-half of the distance from the center of the rotor to the outer tips of the blades; and
   a blade pitch control mechanism connected to the inner ends of the blade shafts and operable during rotation of the rotor to effect said rotation of said blade shafts.

7. An autogyro as claimed in claim 6, wherein said pitch control mechanism is operable to cause the pitch of the blades to alter as they complete each revolution about the centre of the rotor so that the pitch of the blades traversing either side of the rotor can be increased and the pitch of the blades traversing the other side of the rotor correspondingly decreased.

8. An autogyro as claimed in claim 7, wherein the pitch control mechanism comprises a ring member disposed concentrically about the axis of rotation of the rotor and mounted on the rotor to rotate therewith but capable of tilting movement relative to said axis, levers providing interconnections between the ring member and the inner ends of the blade shafts such that the blade shafts can be rotated in said journal mountings by tilting movement of the ring member relative to said axis and control means to tilt the ring member relative to said axis and laterally of the fore and aft direction with respect to the autogyro.

9. An autogyro as claimed in claim 8, wherein said control means acts on the ring member via resilient connections whereby localized excessive wind reaction forces on blades at any region of the rotor can cause tilting movement of said ring member to produce equal and opposite pitch changes of the blades at said region and a diametrically opposite region of the rotor regardless of the condition of said control means.

10. An autogyro as claimed in claim 7, wherein the rotor is rotatable on an axle which is pivotally connected to the pylon for fore and aft pivoting movement with respect to the autogyro and there is means to control said fore and aft pivoting movement thereby to vary the attitude of the rotor relative to the fuselage.

* * * * *